Patented June 20, 1950

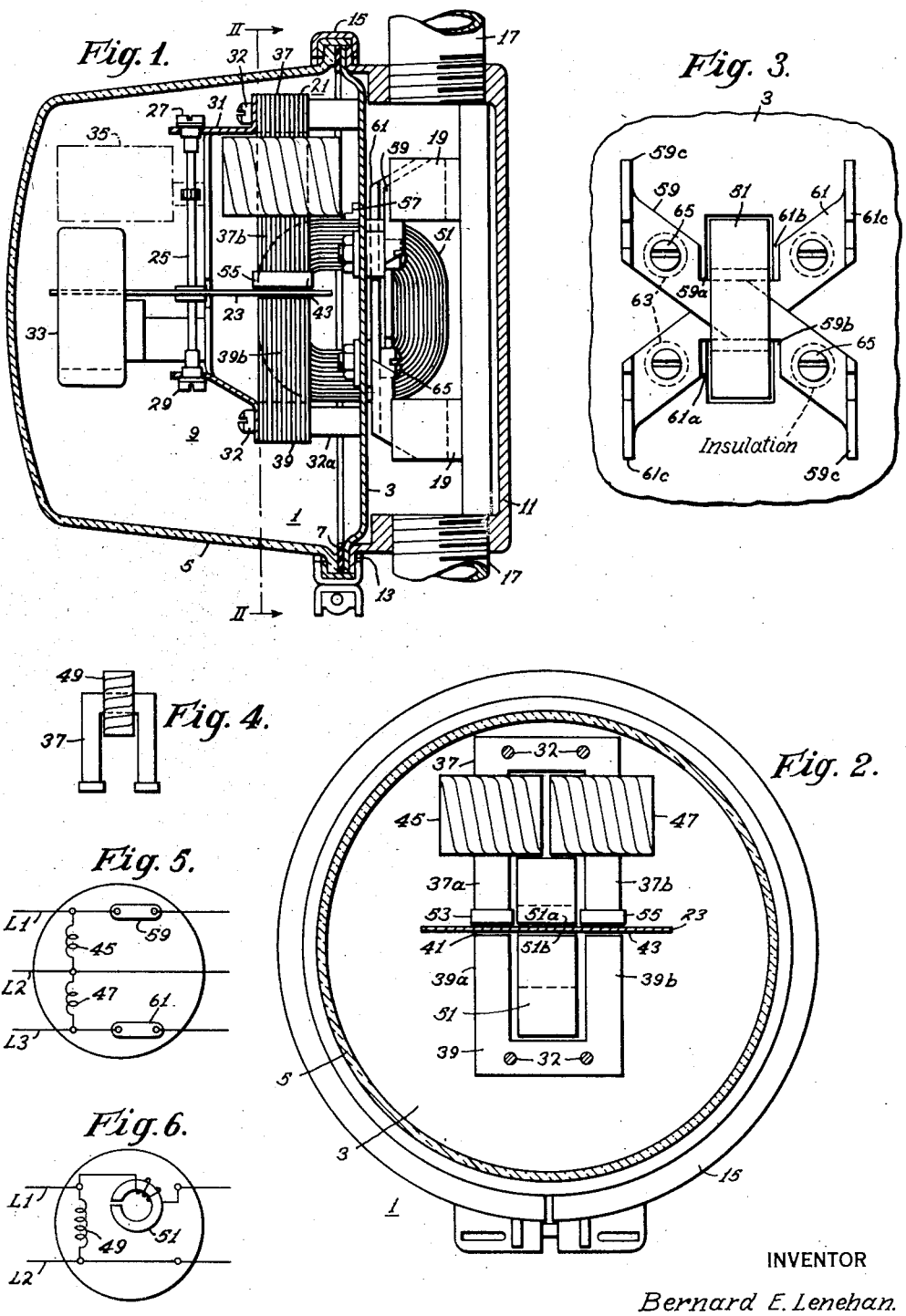

2,512,346

UNITED STATES PATENT OFFICE 2,512,346

WATT-HOUR METER

Bernard E. Lenehan, Bloomfield, N. J., assignor to Westinghouse Electric Corporation, East Pittsburgh, Pa., a corporation of Pennsylvania Application October 30, 1947, Serial No. 783,043

9 Claims. (Cl. 172—278)

This invention relates to induction instruments, such as relays and watthour meters, and it has particular relation to simplified electromagnets and housings for watthour meters.

In accordance with the invention, a watthour meter is disposed substantially within a casing. However, the watthour meter includes an electromagnet having a current magnetic structure which extends through the casing. The external portion of the magnetic structure permits the external application of a series or current winding for the watthour meter. Consequently, the current winding may be applied by the manufacturer or by the person installing the meter without disturbing the parts located within the casing.

The portion of the magnetic structure projecting from the casing and the current winding are enclosed within a suitable terminal chamber. Preferably this terminal chamber takes the form of a socket. The socket and the current winding preferably have associated therewith cooperating electro-conductive jaws and blades which engage when the casing of the watthour meter is secured to the socket. It will be observed that the casing and socket form a housing which completely protects the watthour meter.

The electromagnet for the watthour meter conveniently may be constructed of two magnetic loops which are located in planes at right angles to each other. One of the magnetic loops conveniently may be constructed by spirally winding a strip of magnetic material in a loop and bonding the convolutions of the strip to each other by a suitable adhesive. An air gap then may be formed in the loop for reception of the armature of the watthour meter.

It is, therefore, an object of the invention to provide a watthour meter having a casing through which a portion of the electromagnet structure extends.

It is a further object of the invention to provide a watthour meter with a casing permitting the application of a current winding to the watthour meter externally of the casing.

It is a still further object of the invention to provide a watthour meter as defined in the preceding paragraph wherein the exposed portion of the electromagnet and the current winding are located in a terminal chamber having contacts detachably associated with the current winding.

It is a still further object of the invention to provide a watthour meter having an electromagnet including magnetic loops at right angles to each other.

It is also an object of the invention to provide a watthour meter wherein the electromagnet includes a wound magnetic core.

Other objects of the invention will be apparent from the following description taken in conjunction with the accompanying drawing, in which:

Figure 1 is a sectional view in elevation of a watthour meter embodying the invention;

Fig. 2 is a view taken along the line II—II of Fig. 1;

Fig. 3 is a detail view in rear elevation showing a portion of the watthour meter of Fig. 1 with the socket removed;

Fig. 4 is a view in front elevation showing a modification of a portion of the electromagnet employed in the watthour meter of Fig. 1;

Fig. 5 is a schematic view showing connections suitable for the watthour meter of Fig. 1; and, Fig. 6 is a schematic view showing watthour meter connections suitable for two-wire service.

Referring to the drawing, Fig. 1 shows an induction watthour meter assembly which includes a casing 1. Conveniently the casing 1 may include a base plate 3 having a glass cover 5 detachably secured thereto. A gasket 7 may be interposed between the base plate 3 and the glass cover 5. The casing is designed to receive substantially a watthour meter 9.

The casing 1 forms part of a complete housing which includes a terminal chamber in the form of a socket 11. This socket has an annular flange 13 which engages the rim of the base plate 3. A sealing ring 15 may be employed for sealing the base plate 3, the glass cover 5 and the socket 11 to each other in a manner well understood in the art. A suitable conduit 17 may be secured to the socket for guiding line and load conductors into the interior of the socket. Furthermore, the socket may contain suitable electro-conductive contact jaws 19 to which the line and load conductors may be attached. The casing, socket and sealing ring are well known in the prior art, suitable constructions therefor being shown, for example, in the Bradshaw et al. Patent 1,969,499.

The watthour meter 9 is secured to the base plate 3 and includes an electromagnet 21 which when energized establishes within the casing 1 a shifting magnetic field. An electro-conductive disk armature 23 has a portion disposed in the shifting magnetic field. The armature is mounted on a shaft 25 and the shaft is supported for rotation by bearing screws 27 and 29 which are secured to a suitable frame 31. The frame conveniently may be secured with the electromagnet 19 by machine screws 32 to posts 32a which are attached to the base plate 3 in any suitable manner. A damping magnet 33 is provided for damping rotation of the armature 23. As well understood in the art, the damping magnet includes one or more permanent magnets which establish a magnetic field for the armature 23. Suitable translating means 35 are responsive to rotation of the shaft 25. For example, the translating means 35 may take the form of a conventional watthour meter register.

The electromagnet 21 includes two magnetic loops which are at right angles to each other. One of these magnetic loops is formed by two U-shaped magnetic members 37 and 39. As shown more clearly in Fig. 2, the magnetic member 37 is located above the armature 23 and has two poles 37a and 37b terminating in pole faces adjacent the upper face of the armature 23. The magnetic member 39 is located below the armature 23 and has poles 39a and 39b terminating in pole faces adjacent the lower face of the armature 23. The magnetic members 37 and 39 together form a magnetic loop having two air gaps 41 and 43 disposed in a common plane for reception of the armature 23.

The magnetic members 37 and 39 preferably are laminated and may be constructed in various ways. For example, they may be constructed by spirally winding a strip of magnetic material and bonding the layers of the magnetic material together in the manner disclosed in the Hodnette Patent 2,408,211. The resulting magnetic core may be cut to form the two magnetic members 37 and 39. Preferably, however, the magnetic members 37 and 39 are formed of punchings from sheets of soft magnetic material which are suitably secured to each other.

The magnetic loop formed by the magnetic members 37 and 39 may be energized in accordance with either voltage or current of an associated electrical circuit. It will be assumed that the energization is in accordance with the voltage of the associated circuit and to this end voltage windings 45 and 47 are mounted on the poles 37a and 37b. These windings may be form wound and subsequently slipped over the poles of the magnetic member 37. Alternatively as shown in Fig. 4, a single voltage winding 49 may be employed and may be wound directly on the magnetic member 37. If the two windings 45 and 47 are employed, they are connected either in parallel or in series to direct magnetic flux in the same direction through the magnetic member 37.

The second magnetic loop comprises a C-shaped magnetic member 51 having opposed pole faces 51a and 51b which are spaced to define an air gap within which a portion of the armature 23 is located. (See Fig. 2.) Conveniently, the magnetic member 51 may be formed by spirally winding a thin strip of soft magnetic material to form a loop. The convolutions of the loop are suitably bonded together by a bonding material such as a phenolic resin. Suitable technique for constructing such a magnetic loop is set forth in the previously mentioned Hodnette patent. Following the bonding operation, a slot may be cut in the loop for the purpose of providing the air gap between the pole faces 51a and 51b. This construction of the magnetic member 51 is inexpensive and permits the utilization of oriented magnetic material having desirable magnetic properties. Such material is described in the aforesaid Hodnette patent.

It will be noted that portions of the magnetic member 51 are located between the poles 37a and 37b of the magnetic member 37. Consequently, some shunting of magnetic flux away from the air gaps 41 and 43 may occur through the magnetic member 51. Since it is desirable that the winding 45 and 47 be highly reactive, such shunting is not objectionable. A reactive impedance is desirable for the purpose of bringing the magnetic flux flowing through the magnetic core 37 substantially into quadrature with the voltage applied with the winding 45 and 47. Exact quadrature may be obtained by employing lagging loops 53 and 55 around the poles 37a and 37b adjacent the air gaps 41 and 43. Each of the lagging loops includes a closed-circuit coil having one or more turns.

Referring to Fig. 1, it will be observed that the magnetic member 51 projects through the base plate 3. The magnetic member 51 may be secured to the base plate in any suitable manner, a bracket 57 being illustrated for such purpose. Since a portion of the magnetic member 51 is accessible externally of the casing 1, a winding may be applied to the magnetic member 51 without disturbing the casing 1 or its contents in any way. Such a winding may be applied by passing a conductor through the opening in the magnetic member 51 a sufficient number of times to form the desired number of turns. In the specific embodiment illustrated in Fig. 1, the windings take the form of copper straps 59 and 61. These straps pass through the opening in the magnetic member 51 and, as clearly illustrated in Fig. 3, are angularly displaced from each other about the point of intersection thereof. Insulating bushings 63 may pass through the base plate 3 for the purpose of facilitating attachment of the straps 59 and 61 to the base plate. As illustrated in Figs. 1 and 3, bolts 65 pass through the straps and the bushings for the purpose of securing the straps to the base plate. The straps may be insulated from each other and from other parts of the watthour meter assembly by suitably spacing the straps from each other and from other parts, or suitable insulation, such as insulating tape, may be applied to the straps for insulating purposes. As shown in Fig. 3, the strap 59 may have notches 59a and 59b cut therein for the purpose of providing adequate clearance from the magnetic member 51. Similar notches 61a and 61b may be constructed in the strap 61.

The ends of the straps are bent at right angles to the base plate 3 for the purpose of providing contact blades 59c and 61c. These contact blades are positioned for reception in the contact jaws 19 of the socket 11. Movement of the casing 1 into mounted position relative to the socket 11 automatically inserts the contact blades into the associated contact jaws. Removal of the casing 1 from the socket 11 automatically separates the contact blades and jaws.

It will be understood that each of the straps 59 and 61 constitutes a one-turn winding for the magnetic member 51. Consequently, these windings are suitable for three-wire service. Suitable connections are illustrated in Fig. 5 wherein conductors L1 and L3 are the main conductors of a three-wire service having a center conductor L2. The straps 59 and 61 are connected in the conductors L1 and L3 with proper polarity to produce aiding magnetomotive forces in the magnetic member 51. The windings 45 and 47 may be connected in series across the conductors L1 and L2 and the common connection of these windings, if desired, may be connected to the conductor L2.

As previously pointed out, the current winding may be applied to the magnetic member 51 in the field. For example, Fig. 6 illustrates a two-wire service having the conductors L1 and L2. The person installing the watthour meter may wind a portion of the conductor L1 around the external part of the magnetic member 51 to provide as many turns as required. The insulation of the conductor L1 ordinarily will suffice for insulation between the turns and the magnetic member 51. However, additional insulation may be provided in accordance with standard practice if required. Fig. 6 assumes that the voltage winding 49 illustrated in Fig. 4 is employed in the watthour meter.

It is believed that the installation and operation of the watthour meter will be apparent from the foregoing discussion. The watthour meter parts are first assembled in the base plate 3 in the manner illustrated in Fig. 1. However, if the current windings are to be applied in the field, the straps 59 and 61 would be omitted. Assuming that the straps are employed together with the socket 11, the line and load conductors are connected to the appropriate contact jaws 19 in the socket. The watthour meter together with its casing then are mounted on the socket 11, such mounting ordinarily inserting the blades 59c and 61c in the associated contact jaws 19. After application of the sealing ring 15, the watthour meter is completely installed.

Although the invention has been described with reference to certain specific embodiments thereof, numerous modifications are possible. Consequently, it is intended to cover all embodiments falling within the spirit and scope of the invention.

I claim as my invention:

1. In an induction meter device for measuring a function of the product of two separately variable alternating quantities, a meter casing, an electromagnet effective when energized from an alternating-current source for establishing a shifting magnetic field within the casing, said electromagnet having a magnetic structure extending through a wall of the casing for receiving externally of the casing a winding which when energized directs a first magnetic flux through the magnetic structure to said magnetic field within the casing, said electromagnet having a winding within the casing for directing, when energized, a second magnetic flux through the magnetic structure to said magnetic field, an electro-conductive armature, and means mounting the electro-conductive armature within the casing for rotation relative to the electromagnet, said armature having a portion disposed within the shifting magnetic field for producing a torque acting to rotate the armature relative to the electromagnet.

2. An induction meter device, as defined in claim 1 wherein the magnetic structure comprises a magnetic loop having an air gap therein located within the casing for receiving a portion of the armature, said loop having a portion disposed outside said casing for receiving a winding located outside said casing, whereby a winding may be applied to the loop externally of the casing for establishing, when energized, a magnetic field in the air gap located within the casing.

3. An induction meter device as defined in claim 2 wherein the loop is formed of a spiral winding of magnetic strip material bonded together by adhesive.

4. An induction meter device as defined in claim 2 in combination with a winding extending through the portion of the loop outside said casing, and a socket substantially enclosing the winding and the portion of the loop outside said casing, said winding and said socket having detachable connectors for establishing and severing connections between said winding and conductors located in the socket in response to movement of the socket relative to the casing.

5. A magnetic core for an induction electrical instrument comprising a C-shaped magnetic loop formed of spirally wound magnetic strip, and an insulating adhesive bonding the convolutions of said magnetic strip, said loop having a pair of opposed pole faces spaced from each other in the direction of a line intersecting both of the pole faces substantially at right angles, said pole faces defining an air gap.

6. A magnetic core as defined in claim 5 in combination with an electro-conductive armature, said armature having a portion disposed in said air gap, each of the opposed pole faces being adjacent a separate face of the armature, and means mounting the armature for rotation relative to the magnetic loop about an axis parallel to said line.

7. In an induction instrument, an electromagnet comprising a pair of U-shaped magnetic members, the ends of each of the U-shaped members providing a pair of pole faces disposed in a single plane, said magnetic members being disposed in a common plane substantially perpendicular to said single plane with said pairs of pole faces adjacent each other but spaced to define a pair of air gaps, a magnetic loop disposed substantially at right angles to said plane, said magnetic loop having a pair of opposed pole faces defining an air gap located between said pair of air gaps.

8. In an induction instrument, a pair of U-shaped magnetic members disposed in a substantially common plane, the ends of each of the U-shaped members providing a pair of pole faces disposed in a single plane substantially perpendicular to the common plane, said members having their pairs of pole faces adjacent each other to define a substantially closed magnetic loop, said members being spaced to define two air gaps between their pole faces, an electro-conductive disc armature having portions disposed in said air gaps, means mounting the armature for rotation relative to the magnetic members about an axis substantially transverse to the single plane, a C-shaped magnetic element having opposed pole faces defining a third air gap, said magnetic element extending around an edge of the armature to position the third air gap between said first-named two air gaps, and winding means associated with said magnetic members, said winding means when energized being effective for directing magnetic flux around said magnetic loop.

9. An induction instrument as defined in claim 8 wherein a portion of said magnetic element shunts magnetic flux supplied by said winding means away from the first-named two air gaps, and lagging means for lagging magnetic flux supplied by said winding means which crosses the first-named two air gaps.

BERNARD E. LENEHAN.

REFERENCES CITED

The following references are of record in the file of this patent:

UNITED STATES PATENTS

| Number | Name | Date |
|---|---|---|
| 508,620 | Johnson et al. | Nov. 14, 1893 |
| 1,942,076 | Warren | Jan. 2, 1934 |
| 2,057,503 | Sawyer | Oct. 13, 1936 |
| 2,199,630 | Hodnette | May 7, 1940 |
| 2,423,869 | Blessing | July 15, 1947 |

FOREIGN PATENTS

| Number | Country | Date |
|---|---|---|
| 1381/26 | Australia | Apr. 9, 1926 |

OTHER REFERENCES

"Electrical Measuring Instruments," Drysdale and Jolley (Van Nostrand, 1924), part 2, page 108, lines 21-30, Scientific Library.